United States Patent
Hesse

(10) Patent No.: US 7,178,858 B1
(45) Date of Patent: Feb. 20, 2007

(54) DEFLECTOR ASSEMBLY FOR MOTORCYCLE

(76) Inventor: Walter T. Hesse, 4815 Plummers Point Rd., Oshkosh, WI (US) 54904

( * ) Notice: Subject to any disclaimer, the term of this patent is extended or adjusted under 35 U.S.C. 154(b) by 125 days.

(21) Appl. No.: 11/096,522

(22) Filed: Apr. 1, 2005

(51) Int. Cl.
*B62J 17/06* (2006.01)

(52) U.S. Cl. .................................. 296/180.1; 296/78.1

(58) Field of Classification Search ............... 296/78.1, 296/180.1, 77.1; 180/68.1
See application file for complete search history.

(56) References Cited

U.S. PATENT DOCUMENTS

| 902,592 | A | 11/1908 | Maughan |
| D57,703 | S | 4/1921 | Miller |
| 1,374,475 | A | 4/1921 | Shaughnessy |
| 1,412,634 | A | 4/1922 | Schreiber |
| 3,971,452 | A | 7/1976 | Morelli |
| 4,130,315 | A | 12/1978 | Shields |
| 4,136,890 | A | 1/1979 | Vertucci |
| D285,427 | S | 9/1986 | Cline |
| D294,817 | S | 3/1988 | Preisler |
| D295,277 | S | 4/1988 | Preisler |
| 4,911,494 | A | 3/1990 | Imai et al. |
| 6,042,171 | A | 3/2000 | Hesse |

FOREIGN PATENT DOCUMENTS

| DE | 545671 | 2/1932 | |
| DE | 2726244 | 12/1978 | |
| GB | 278535 | * 10/1927 | ................ 296/78.1 |

* cited by examiner

*Primary Examiner*—Dennis H. Pedder
*Assistant Examiner*—Melissa A. Black
(74) *Attorney, Agent, or Firm*—Jon Carl Gealow

(57) ABSTRACT

The invention provides a pair of panels, positioned on opposite sides of a motorcycle, and supported on the front portion of the frame of the motorcycle to deflect air flow or wind away from the rider. The panels are pivotally mounted on a bracket which is secured to the frame, such that the panels may be positioned to provide maximum comfort to the rider.

10 Claims, 6 Drawing Sheets

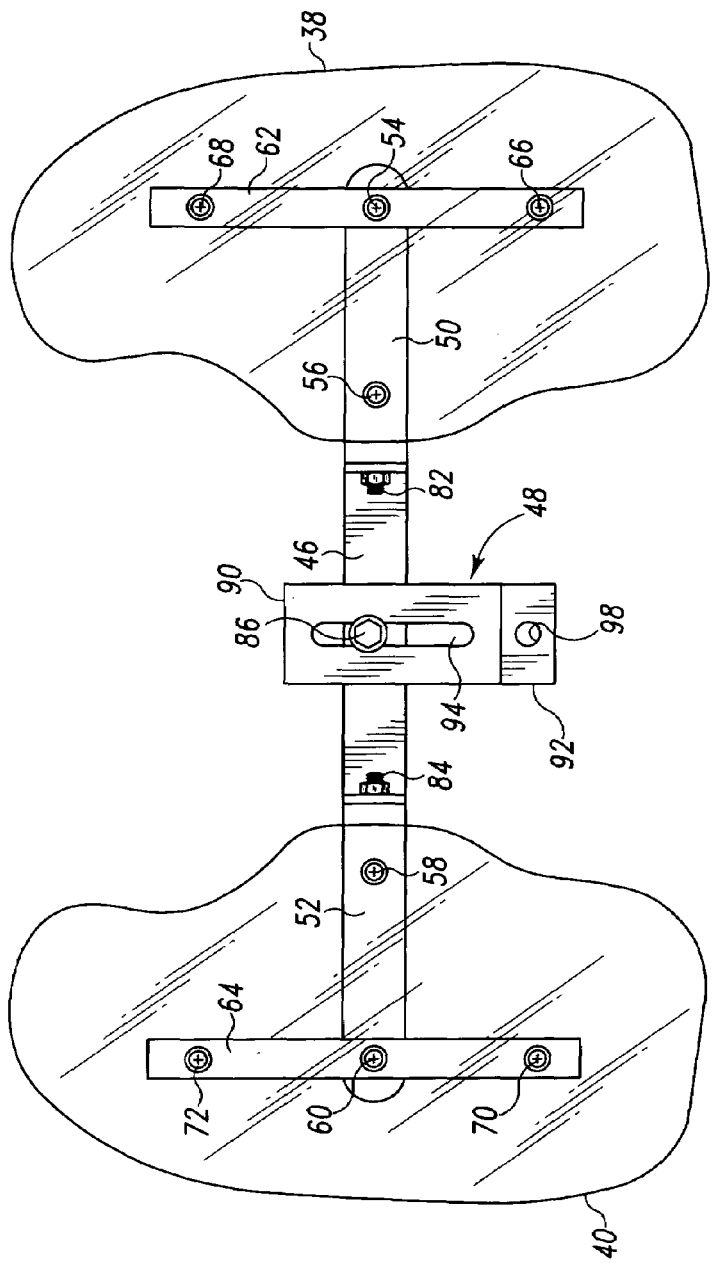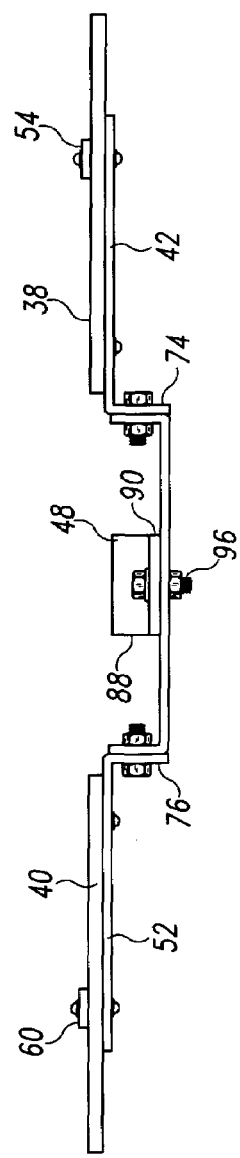
Fig. 4
Fig. 5

DEFLECTOR ASSEMBLY FOR MOTORCYCLE

FIELD OF THE INVENTION

This invention relates to a deflector assembly for a motorcycle. In its more specific aspect, this invention relates to a deflector assembly for a motorcycle for substantially reducing the flow of air against the rider, that is, to protect the rider against wind pressure, especially when operating at high speeds.

BACKGROUND AND PRIOR ART

Motorcycles, especially those used for touring or commuting, have been provided with various designs of shields, deflectors, or fairings to protect the rider or cyclist against wind, water, dirt, and insects. The flow of air, particularly when traveling at high speeds, creates a tiring effect on the rider. With the engine of a motorcycle being mounted midway on the frame, and being exposed, heat from the engine can provide some discomfort to the rider. Therefore, in some instances, shields or deflectors have been designed to direct air toward or across the engine to provide a cooling effect. Thus, the general purpose of the use of shields or deflectors on a motorcycle has been to provide added comfort and safety for the rider.

Generally, the shields or deflectors in use or proposed in the prior art are relatively expensive and/or tend to be heavy, or bulky, and furthermore can be hazardous. Some shields are attached to the handlebars of the bike, or close to them, and therefore tend to interfere with seeing and steering. A windshield, mounted on, and extending above the handlebars of a motorcycle, is a somewhat common add-on, which helps to protect the rider's face from the wind. Even with a windshield, however, there is strong air turbulence under the windshield.

For example, in U.S. Pat. No. 4,130,315, there is shown a fairing comprised of a first section extending the breadth of the handlebars, a second section (windshield) extending above the handlebars for shielding the rider's face, and a third section extending downwardly on opposite sides of the front fork. The bottom section is provided with vents for directing cooling air toward the motorcycle engine and the cyclist.

A cowling assembly or fairing utilizing a windshield in combination with air inlets and outlets is disclosed in U.S. Pat. No. 4,911,494. Air is directed upwardly and away from the rider's head.

An air cooling shield for motorcycles is disclosed in U.S. Pat. No. 1,412,634. Two or more shields are attached to both sides of the motorcycle, and are inclined downwardly and so arranged that the forward edge of the first shield is positioned at a lower level than the forward edge of the second shield. The shields direct air onto the cylinders of the engine, thereby providing a cooling effect.

U.S. Pat. No. 4,136,890 discloses a pair of leg shields mounted on each side of the crash bar of a motorcycle. Each shield is generally planar but curved convexly at the top and outer side to provide a lifting force to the shield.

German patent application P27262448, published Dec. 12, 1978, to Kreidler, discloses a motorcycle fairing consisting of an upper cover 1 (having a depending segment from the windshield that lies essentially in a horizontal plane parallel with the longitudinal axis of the bike) and leg cover 5 (which is essentially horizontally disposed and parallel with the longitudinal axis of the bike). The steering cover and leg cover overlap at 6 and 8, thereby forming a small air column. The planar surfaces of covers 6 and 8 that form this overlap, however, lie in a vertical plane and extend essentially parallel with the longitudinal axis of the bike. Further the two overlapping sections are concentrically arranged, and are concentric to the axis of the fork, so that upon turning, section 6 turns within the arc of section 8. This cover arrangement appears to be unduly large, and the foot peg is restricted to a rearward position.

The applicant has recognized that the shields or fairings disclosed in the prior art are cumbersome, or expensive, or have a high vertical dimension that can interfere with seeing or steering, such as a conventional type windshield used in combination with deflectors or air vents to provide a cooling effect or to protect the rider against wind, water, dirt, etc. In response thereto, the applicant has in the past developed an improved deflector for a motorcycle. That improved deflector is set forth in U.S. Pat. No. 6,042,171 issued on Mar. 28, 2000 to the applicant.

Recognizing that further improvements could be made in the design, assembly and mounting of deflectors for motorcycles, the applicant has invented and developed a deflector for motorcycles which provides such further improvements.

The present invention has, therefore, as its purpose to provide a deflector to protect the rider against wind pressure that overcomes many of the disadvantages of the prior art. The deflector of the present invention is more effective in protecting the rider against wind pressure, while at the same time offering less wind resistance, which lessens the load on the motorcycle engine. The deflector of the present invention directs the wind downward and away from the rider, such that the rider is exposed to little if any under the deflector turbulence. Further, the angular position of the deflector is adjustable, so as to provide the wind deflection which the rider considers most desirable.

It is another purpose or object of the invention to provide a deflector for substantially reducing the flow of air against the rider so as to overcome its tiring effect especially at high speeds.

It is yet another object of the invention to provide such a deflector for use in combination with a conventional type windshield to substantially reduce or eliminate underscreen turbulence.

It is another object of the present invention to provide such a deflector that is relatively inexpensive, aesthetically pleasing, and simple to mount.

It is still a further object of the present invention to provide such a deflector that will enhance the comfort and safety of the rider.

SUMMARY OF THE INVENTION

Broadly, the invention provides a deflector assembly having a pair of panels symmetrically mounted on each side of a motorcycle as viewed from the front. That is, symmetrically mounted with reference to the cental vertical axis of the motorcycle. A motorcycle typically has a front fork with longitudinally spaced apart fork members, and a front steerable wheel is rotatably mounted on the fork. The frame of the motorcycle includes a front portion on which the front fork is rotatably mounted. The front portion of the frame may typically include a pair of tubular members joined together at the front end of the frame and diverging downwardly from each other and extending under the engine to support the engine, gas tank and rider. The deflector comprises a pair of panel members which are substantially identical, and which are mounted on opposite sides of the vertical central axis of the motorcycle. Each panel member is formed as a substantially planar surface, with the planar surfaces being substantially transverse to the longitudinal axis of the motorcycle. Each of the panel members is secured to the longer leg of an L-shaped member. Each of the shorted legs of the L-shaped members are pivotally secured to one of the legs of a U-shaped member, which is in turn secured to a bracket which is in turn secured to the front portion of the frame of the motorcycle. In addition to being supported by the longitudinally extending longer leg of a L-shaped member, an elongated support member may be secured to the longer leg of the L-shaped member and the panel member, in a position generally perpendicular to the longer leg. Depending upon the design of the front portion of the frame of a particular motorcycle, the bracket by which the deflector assembly is attached to the motorcycle may be of different shapes, such as a Z-shape or an L-shape. The L-shaped members being pivotally secured to the U-shaped member, the angular position of the plane of the panel members may be adjusted to provide maximum comfort to the rider. It should be understood that such terms used herein and in the appended claims as being "substantially parallel" and "substantially transverse" are not intended to be restricted to the literal meaning, but can be slightly angled. In a preferred embodiment of this invention, the deflector is used in combination with a conventional or standard windshield mounted on the handlebars of the motorcycle.

BRIEF DESCRIPTION OF THE DRAWINGS

FIG. 4 is a front elevation view of the deflector assembly of the present invention as shown in FIG. 1;

FIG. 5 is a top elevation view of the deflector assembly of the present invention as shown in FIG. 1;

DETAILED DESCRIPTION OF THE INVENTION

Figure 1:
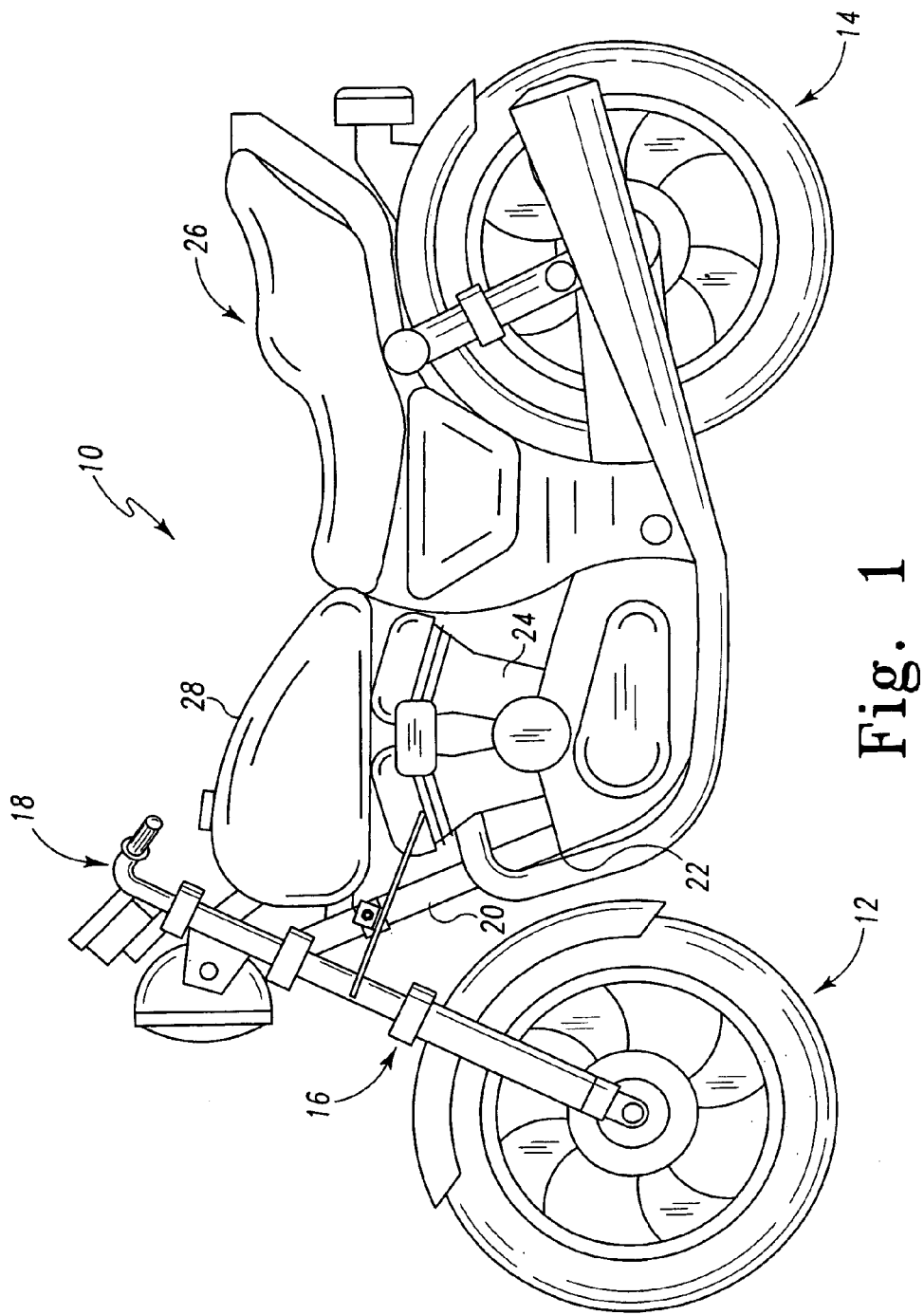
FIG. 1 is side elevation view of a motorcycle having mounted thereon the deflector assembly of the present invention.
Figure 2:
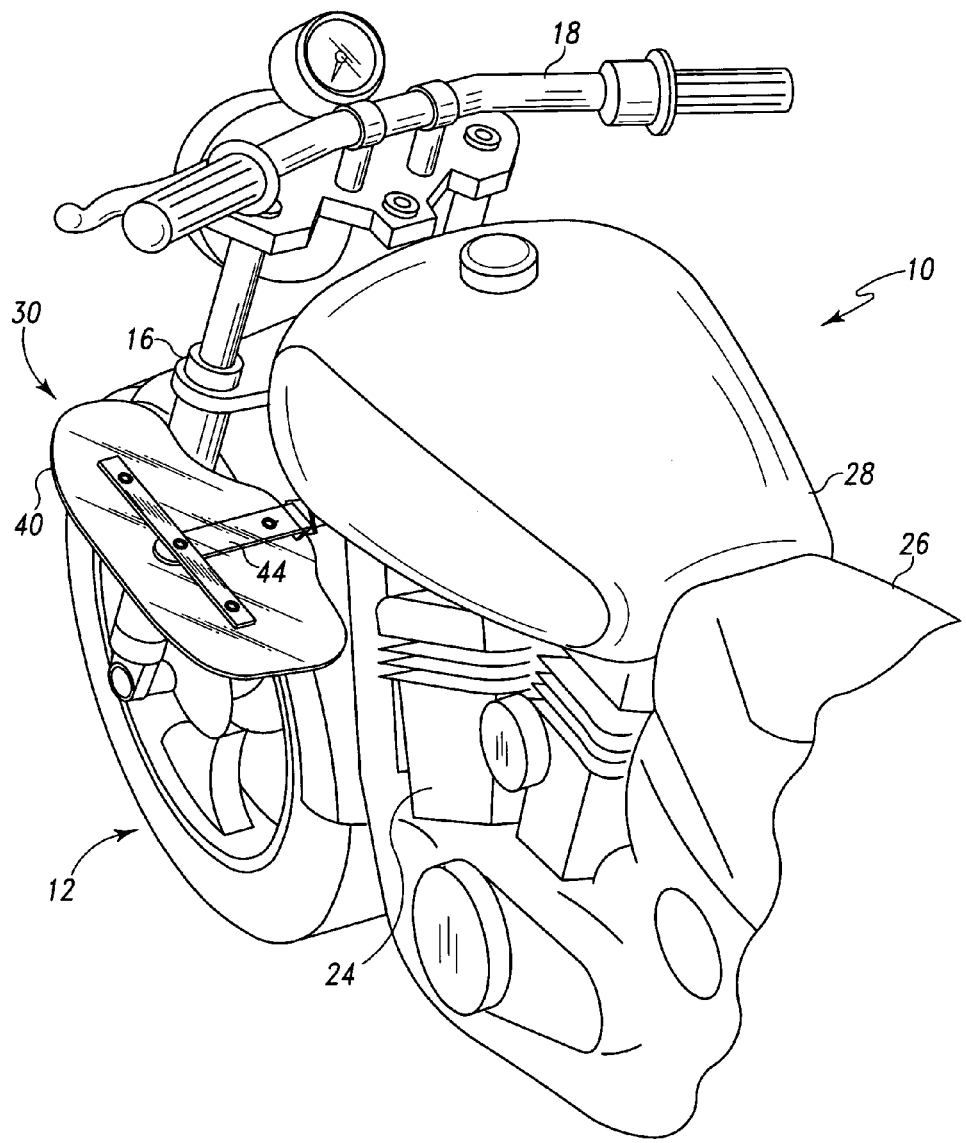
FIG. 2 is left side perspective view of the front portion, viewed from the rear, of the motorcycle shown in FIG. 1, with the deflector assembly of the present invention mounted thereon.
Figure 3:
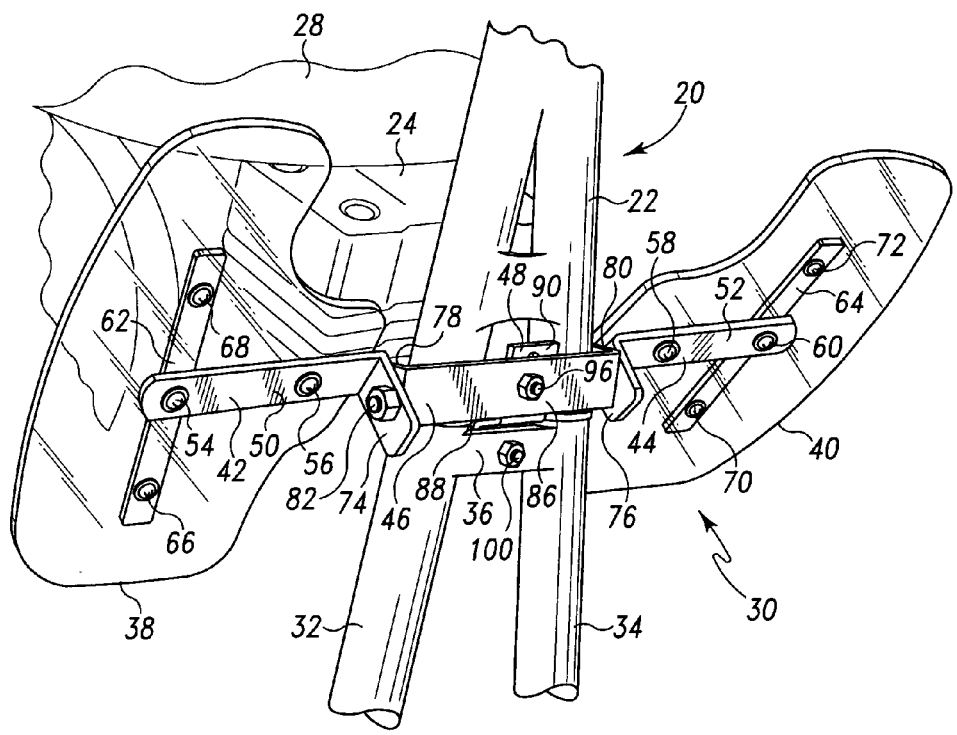
FIG. 3 is a fragmentary perspective view from the front of the motorcycle shown in FIG. 1, with the deflector assembly of the present invention mounted thereon.
Figure 6:
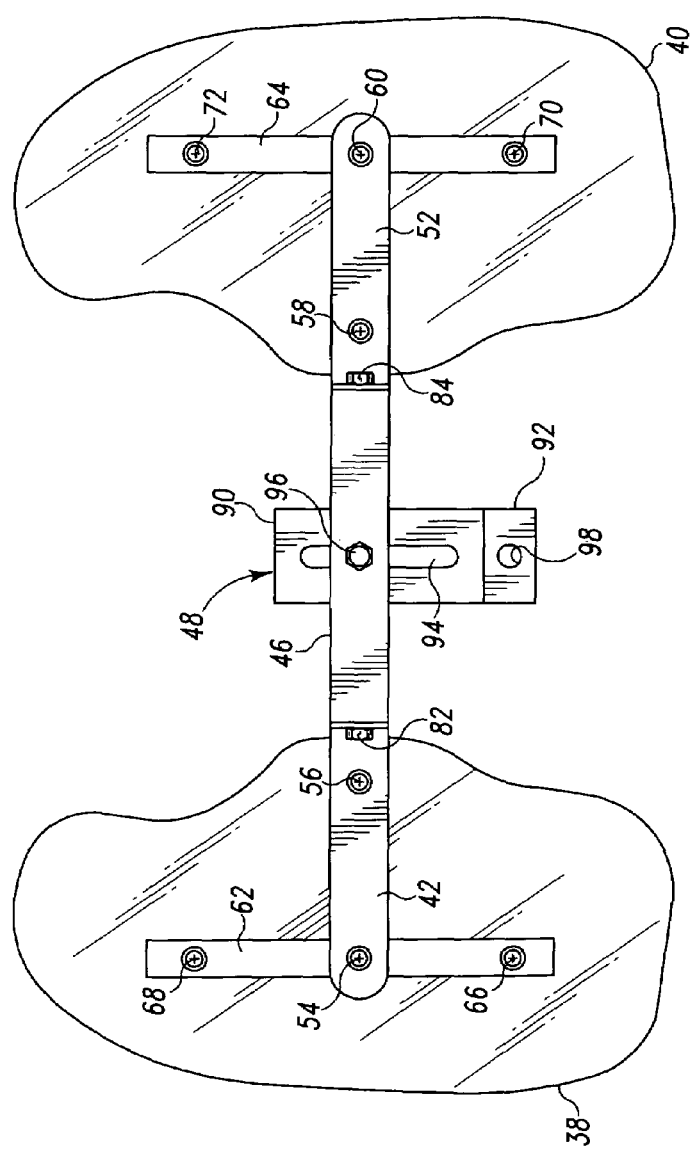
FIG. 6 is a rear elevation view of the deflector assembly of the present invention as shown in FIG. 1.

Referring to the drawings wherein like reference numerals refer to similar parts throughout the various views, there is shown in FIGS. 1–3 all or portions of a motorcycle of conventional structure provided with a deflector assembly in accordance with the present invention. Such a motorcycle 10, has a front steerable wheel 12 and a rear wheel 14. The front wheel 12 is rotatably supported on a front fork 16 and is steered by handlebars 18 mounted on the fork which is rotatably supported by the front portion 20 of a frame 22. The usual principal components of a motorcycle, engine 24, seat 26, and fuel tank 28, are supported by the frame 22, which is supported at the rear end by rear wheel 14.

The deflector assembly 30 of this invention is supported on the front portion 20 of the frame 22 as best shown in FIG. 3. The section of the front portion 20 of the frame 22, shown in FIG. 3, is formed by two members 32 and 34 which are joined together at the top, and spread apart toward the bottom. The front portion extends above the portion shown in FIG. 3 to rotatably support the front fork 16. A generally horizontal cross-member 36 extends between the members 32 and 34. The deflector assembly 30 of this invention includes essentially identical first and second panels 38 and 40. As is best shown in FIGS. 3–6, the panels 38 and 40 are supported on the front portion 20 of the frame 22 by a support structure which includes a pair of L-shaped members 42 and 44, a U-shaped member 46, and a bracket 48. Longer legs 50 and 52 of L-shaped members 42 and 44 are secured to the panels 38 and 40 respectively by securing devices, shown as pairs of screws and acorn nuts 54, 56, 58 and 60. To provide further support to the panels 38 and 40, a pair of elongated members 62 and 64 are provided. These members are positioned substantially perpendicular to the longer legs 50 and 52 of the L-shaped members, and are secured to the panels 38 and 40 on the opposite side of the longer legs 50 and 52, by securing devices 54 and 60, and additional securing devices, shown as screws and acorn nuts, 66, 68, 70, and 72. Shorter legs 74 and 76 of the L-shaped members 42 and 44 are secured to legs 78 and 80 of the U-shaped member 46 by fastening devices shown as screws and acorn nuts 82 and 84.

Central section 86 of the U-shaped member 46 is secured to bracket 48 which is in turn secured to a portion of the frame of the motorcycle 10. The bracket 48 has a Z-shape, with a mid-section 88, and first and second outer sections 90 and 92. First outer section 90 is provided with an elongated slot 94 for receiving a fastening device 96 such as a screw and acorn nut which secures the central section 86 of the U-shaped member 47 to the bracket 48. The second outer section 92 is provided with an aperture 98, which is aligned with a hole in the cross member 36 of the frame 22 of the motor cycle. A securing device 100, shown as a bolt and a nut, is received in the aperture 98 and the hole in the cross member 36 to secure the deflector assembly 30 to the frame of the motorcycle.

The first and second panel members 38 and 40 may be constructed of any suitable material such as metal (e.g., steel or aluminum), or plastic (e.g., LEXAN, LUCITE, acrylic, polyethylene, or polyvinyl chloride). As shown in the Figs., the panels are made of a transparent plastic. The plastic may be tinted or colored to be aesthetically more pleasing. The L-shaped members 42 and 44, the U-shaped member 46, and the elongated members 62 and 64 are formed of a strong material such as steel, and are provided with an attractive finish, such as chrome. Similarly, all of the fastening members are provided with an attractive finish, such as chrome.

Figure 7:
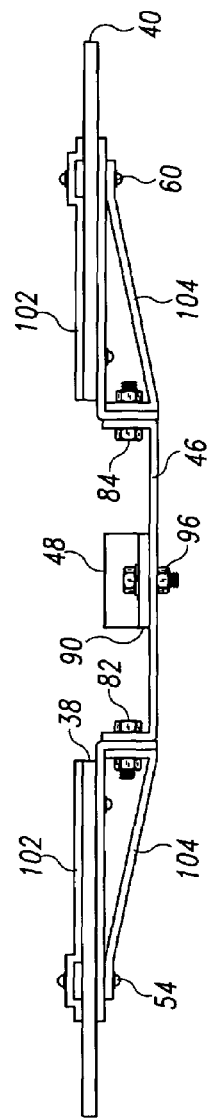
FIG. 7 is a top elevation view of a second embodiment of the deflector assembly of the present invention.

Referring to FIG. 7, a top elevation view of a second embodiment of this invention will be described. In this embodiment, opaque members 102 are mounted on the opposite side of the panels 38 and 40, from the L-shaped members 42 and 44. These opaque members are provide, such that if debris should become lodged between the L-shaped members 42 and 44, and the panels 38 and 40, it will be hidden from view. Further, as shown in the second embodiment, generally L-shaped reinforcing members 104 are positioned to strengthen the L-shaped members 42 and 44. The L-shaped members 104 are secured by the same fasteners as secure the L-shaped members 42 and 44 to the U-shaped member 46 and the panels 38 and 40.

Figure 8:
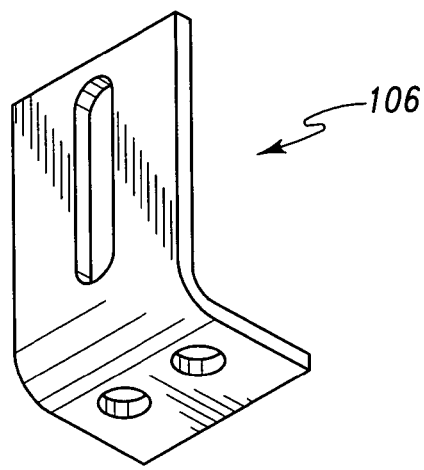
FIG. 8 is a perspective view of an alternate mounting bracket for the deflector assembly of the present invention.

Referring to FIG. 8, if the motorcycle on which the deflector assembly of this invention is to be installed is more conveniently provided with vertical mounting holes in the front portion of the frame than a horizontal hole, then an L-shaped mounted bracket 106 is provided.

It thus will be observed that the deflector of this invention provides numerous advantages and provides for comfort and safety for the rider. The deflector adds very little weight to the motorcycle, and its outer boundary lies wholly within the front profile of the cycle. Most significantly, the deflector substantially reduces air pressure against the driver, while providing a cooling effect to the motor and the legs of the driver. A deflector fabricated of tinted plastic is particularly aesthetic, which is further enhanced by the symmetry of the structure when mounted on the cycle. Further, it should be understood that the foregoing detailed description has been given for clearness of understanding only, and no unnecessary limitations should be understood therefrom, as modifications will be obvious to those skilled in the art.

What is claimed is:

1. A motorcycle wind deflector assembly comprising:
   A. a pair of wind deflecting shields,
   B. a pair of L-shaped members having a first longer leg and a second shorter leg, said longer leg of said L-shaped members attached to one of said wind deflecting shields,
   C. a U-shaped bracket having a base member and two legs, each of said legs attached to one of said shorter legs of said pair of L-shaped members,
   D. a bracket having at least two portions, one of said portions attached to said U-shaped bracket, and the other of said portions connected to a motorcycle.

2. The motorcycle wind deflector assembly of claim 1, wherein said pair of wind deflector shields are formed of a transparent material.

3. The motorcycle wind deflector assembly of claim 1, wherein said pair of wind deflector shields are attached to said L-shaped members and said L-shaped members are attached to said U-shaped members by fastening members.

4. The motorcycle wind deflector assembly of claim 3, wherein said fastening members are bolts and acorn nuts.

5. The motorcycle wind deflector assembly of claim 1, wherein said bracket is one of L or Z-shaped.

6. The motorcycle wind deflector assembly of claim 1, wherein said L-shaped members and said U-shaped members are formed of a strong material with an attractive finish.

7. The motorcycle wind deflector assembly of claim 1, wherein a pair on elongated members are provided generally perpendicular to said longer legs of said L-shaped members to provide additional support for said wind deflecting shields.

8. The motorcycle wind deflector assembly of claim 1, wherein a second pair of L-shaped members are provided to reinforce said pair of L-shaped members.

9. The motorcycle wind deflector assembly of claim 1, wherein opaque members are provided on the opposite side of the wind deflecting shields from said longer legs of said L-shaped members to hide any debris which might become lodged between said longer legs of said L-shaped members and said wind deflecting shields.

10. The motorcycle wind deflector assembly of claim 1, wherein said bracket is L-shaped.

* * * * *